US010547785B2

United States Patent
Chen

(10) Patent No.: US 10,547,785 B2
(45) Date of Patent: Jan. 28, 2020

(54) PHOTOGRAPHING METHOD INCLUDING IMAGE REGISTRATION BASED ON REFERENCE IMAGE, SHAKE INFORMATION, AND A MOTION VECTOR TABLE

(71) Applicant: Huawei Technologies Co., Ltd., Shenzhen (CN)

(72) Inventor: Gang Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/563,280

(22) PCT Filed: Mar. 31, 2015

(86) PCT No.: PCT/CN2015/075450
§ 371 (c)(1),
(2) Date: Sep. 29, 2017

(87) PCT Pub. No.: WO2016/154873
PCT Pub. Date: Oct. 6, 2016

(65) Prior Publication Data
US 2018/0077353 A1     Mar. 15, 2018

(51) Int. Cl.
*H04N 5/232*    (2006.01)
(52) U.S. Cl.
CPC ..... *H04N 5/23267* (2013.01); *H04N 5/23254* (2013.01); *H04N 5/23261* (2013.01); *H04N 5/23296* (2013.01)

(58) Field of Classification Search
CPC .......... H04N 5/23267; H04N 5/23261; H04N 5/23277
See application file for complete search history.

(56) References Cited

U.S. PATENT DOCUMENTS

| 2004/0238718 A1 | 12/2004 | Washisu |
| 2006/0140604 A1 | 6/2006 | Suda |
| 2008/0069551 A1 | 3/2008 | Wakamatsu et al. |

(Continued)

FOREIGN PATENT DOCUMENTS

| CN | 1574898 A | 2/2005 |
| CN | 1798263 A | 7/2006 |

(Continued)

*Primary Examiner* — Luong T Nguyen
(74) *Attorney, Agent, or Firm* — Leydig, Voit & Mayer, Ltd.

(57) ABSTRACT

A photographing method includes: collecting, by a terminal device, data of M image frames of a photographed object, and processing the data of the M image frames to obtain M image frames; when collecting data of each of the M image frames of the photographed object, obtaining angular acceleration of the terminal device in an X-axis direction, a Y-axis direction, and a Z-axis direction; processing—the obtained angular acceleration in a period corresponding to the data of each image frame into shake information; selecting—one image frame from the M image frames as a reference image, performing registration on each of (M−1) image frames based on the reference image, the shake information, and a preset motion vector table, and performing fusion on the registered images; and displaying the compressed image.

14 Claims, 9 Drawing Sheets

(56) References Cited

U.S. PATENT DOCUMENTS

| | | | |
|---|---|---|---|
| 2008/0317289 A1* | 12/2008 | Oyaizu | G06T 5/50 |
| | | | 382/107 |
| 2012/0019678 A1 | 1/2012 | Fujita | |
| 2012/0093399 A1* | 4/2012 | Paik | H04N 5/23212 |
| | | | 382/164 |
| 2012/0208454 A1* | 8/2012 | Chai | H04B 5/02 |
| | | | 455/41.1 |
| 2013/0194442 A1 | 8/2013 | Yazawa | |
| 2013/0208093 A1* | 8/2013 | Sun | G06T 5/003 |
| | | | 348/46 |
| 2014/0009631 A1 | 1/2014 | Topliss | |
| 2014/0313354 A1 | 10/2014 | Kusanagi | |

FOREIGN PATENT DOCUMENTS

| | | | |
|---|---|---|---|
| CN | 101150665 A | | 3/2008 |
| CN | 101572777 A | | 11/2009 |
| CN | 103051836 A | | 4/2013 |
| CN | 203365875 U | | 12/2013 |
| EP | 2706747 A2 | | 3/2014 |
| JP | 2009-296561 | * | 12/2009 |
| WO | 2013076350 A1 | | 5/2013 |

* cited by examiner

| | | | | | | |
|---|---|---|---|---|---|---|
| Exposure time | T0 | T0 | | T1 | | T |
| Amplitude | M0 | M0 | | M1 | | M |
| Frequency | F0 | F0 | | F1 | | F |
| Depth | D0 | D0' | | D1 | | D |
| Area 1 | Vertical motion vector 1 | $(WVV0)_1$ | $(WVV0)_1'$ | $(WVV1)_1$ | ⋮ | $(WVV)_1$ |
| | Horizontal motion vector 1 | $(WVH0)_1$ | $(WVH0)_1'$ | $(WVH1)_1$ | | $(WVH)_1$ |
| Area 2 | Vertical motion vector 2 | $(WVV0)_2$ | $(WVV0)_2'$ | $(WVV1)_2$ | | $(WVV)_2$ |
| | Horizontal motion vector 2 | $(WVH0)_2$ | $(WVH0)_2'$ | $(WVH1)_2$ | | $(WVH)_2$ |
| ⋮ | | | ⋮ | | | |
| Area N | Vertical motion vector N | $(WVV0)_N$ | $(WVV0)_N'$ | $(WVV1)_N$ | ⋮ | $(WVV)_N$ |
| | Horizontal motion vector N | $(WVH0)_N$ | $(WVH0)_N'$ | $(WVH1)_N$ | | $(WVH)_N$ |

FIG. 8

| Exposure time | Amplitude | Frequency | Depth | Global motion vector | |
|---|---|---|---|---|---|
| | | | | Vertical motion vector | Horizontal motion vector |
| T0 | M0 | F0 | D0 | $(WVV0)_1$ | $(WVH0)_1$ |
| T0 | M0 | F0 | D0' | $(WVV0)_1'$ | $(WVH0)_1'$ |
| ... | | | | | |
| T1 | M1 | F1 | D1 | $(WVV1)_1$ | $(WVH1)_1$ |
| ... | | | | | |
| T | M | F | D | $(WVV)_1$ | $(WVH)_1$ |

FIG. 9

PHOTOGRAPHING METHOD INCLUDING IMAGE REGISTRATION BASED ON REFERENCE IMAGE, SHAKE INFORMATION, AND A MOTION VECTOR TABLE

CROSS-REFERENCE TO RELATED APPLICATIONS

This application is a National Stage Application of International Application No. PCT/CN2015/075450, filed Mar. 31, 2015, which is hereby incorporated by reference in its entirety.

TECHNICAL FIELD

Embodiments of the present invention relate to the communications field, and in particular, to a terminal device and a photographing method.

BACKGROUND

With increasing popularity of a photographing function of a mobile terminal, people have increasingly high requirements on photographing effects. However, when a photographer holds a mobile terminal to perform photographing, a hand tremble may occur due to factors such as natural body movements. Because of the hand tremble, an image obtained by photographing is blurry, and this problem gets worse especially when exposure time is relatively long or a tremble is relatively strong.

Currently, most common anti-shake methods include optical image stabilization (OIS) and electronic image stabilization (EIS). The EIS achieves an objective of anti-shake by reducing exposure time and using a multi-frame technology. The EIS requires software-based registration, and time required by the software-based registration is directly proportional to registration accuracy and a quantity of frames. The registration refers to a process of performing registration on multiple image frames. To ensure a specific anti-shake effect, the EIS requires relatively high registration accuracy. Consequently, photographing time is relatively long, and photographing experience of a user is relatively poor. The OIS achieves the objective of anti-shake by moving a lens or a module to compensate for shake of a mobile phone. Due to factors such as a technique and a design principle, under a specific requirement for anti-shake performance, the OIS supports a finite shake amount and exposure time, which limits application of the OIS to a high shake scenario and a scenario requiring a long-exposure mode.

However, no effective solution is available for resolving the foregoing problem currently.

SUMMARY

Embodiments of the present invention provide a terminal device and a photographing method, which can improve photographing performance of the terminal device.

According to a first aspect, an embodiment of the present invention provides a terminal device, where the terminal device includes a lens module, an image signal processor, a central processing unit (CPU), and a screen, where the lens module includes an image sensor, a gyro sensor, and a processor, where:

the image signal processor is configured to determine, based on a current photographing scenario, collection parameters of photographing, where the collection parameters include a quantity M of to-be-collected image frames, exposure time of each image frame, and sensitivity of each image frame, where M is a positive integer and M≥2;

the image sensor is configured to collect data of M image frames of a photographed object according to the exposure time and the sensitivity;

the image signal processor is further configured to process the data of the M image frames collected by the image sensor, to obtain processed M image frames;

the gyro sensor is configured to: when the terminal device collects data of each of the M image frames of the photographed object, obtain angular acceleration of the terminal device in an X-axis direction, a Y-axis direction, and a Z-axis direction;

the processor is configured to process the obtained angular acceleration in a period corresponding to the data of each image frame into shake information;

the central processing unit (CPU) is configured to: select, from the processed M image frames, one image frame as a reference image, perform registration on each of M−1 image frames based on the reference image, the shake information, and a preset motion vector table, and perform fusion on the registered images;

the central processing unit (CPU) is further configured to perform compression processing on the fused image to generate a compressed image in a predetermined format; and the screen is configured to display the compressed image.

With reference to the first aspect, in a first implementation manner of the first aspect, that the central processing unit (CPU) is configured to perform registration on each of M−1 image frames based on the reference image, the shake information, and a preset motion vector table is specifically:

the central processing unit is configured to:

calculate relative shake information of each of the M−1 image frames relative to the reference image according to the shake information, obtained by means of processing by the processor, of each of the M−1 image frames and time of each of the M−1 image frames relative to the reference image;

determine a motion vector of each of the M−1 image frames relative to the reference image according to the relative shake information, exposure time of each of the M−1 image frames, and the preset motion vector table; and perform registration on each of the M−1 image frames according to the motion vector.

With reference to the first aspect, in a second implementation manner of the first aspect, the terminal device further includes a proximity sensor, where the proximity sensor is configured to obtain a depth.

With reference to the second implementation manner of the first aspect, in a third implementation manner of the first aspect, that the central processing unit (CPU) is configured to perform registration on each of M−1 image frames based on the reference image, the shake information, and a preset motion vector table is specifically:

the central processing unit (CPU) is configured to perform registration on each of the M−1 image frames based on the reference image, the shake information, the depth, and the preset motion vector table.

With reference to the first aspect, in a fourth implementation manner of the first aspect, that the central processing unit is configured to perform registration on each of M−1 image frames based on the reference image, the shake information, and a preset motion vector table includes:

the central processing unit is configured to:

calculate relative shake information of each of the M−1 image frames relative to the reference image according to the shake information, obtained by means of processing by the processor, of each of the M−1 image frames and time of each of the M−1 image frames relative to the reference image;

search for a relative motion vector of each of the M−1 image frames relative to the reference image according to the relative shake information, exposure time of each of the M−1 image frames, and the preset motion vector table;

search for a motion vector near the relative motion vector based on the relative motion vector; and calculate, based on the relative motion vector and the searched motion vector near the relative motion vector, a matching degree between each of the M−1 image frames and the reference image according to a matching criterion, and perform registration on each of the M−1 image frames based on a motion vector with the highest matching degree.

With reference to any one of the first aspect, or the first to the fourth implementation manners of the first aspect, in a fifth implementation manner of the first aspect, the image signal processor and the central processing unit (CPU) are integrated as a whole.

With reference to any one of the first aspect, or the first to the fourth implementation manners of the first aspect, in a sixth implementation manner of the first aspect, the central processing unit (CPU) and the processor are integrated as a whole.

With reference to any one of the first aspect, or the first to the fourth implementation manners of the first aspect, in a seventh implementation manner of the first aspect, the image signal processor, the processor, and the central processing unit (CPU) are integrated as a whole.

With reference to any one of the first aspect, or the first to the fourth implementation manners of the first aspect, in an eighth implementation manner of the first aspect, the image signal processor and the processor are integrated as a whole.

According to a second aspect, an embodiment of the present invention provides a photographing method, where the method includes:

collecting, by a terminal device, data of M image frames of a photographed object, and processing the data of the M image frames to obtain M image frames, where M is a positive integer and M≥2;

when collecting data of each of the M image frames of the photographed object, obtaining, by the terminal device, angular acceleration of the terminal device in an X-axis direction, a Y-axis direction, and a Z-axis direction;

processing, by the terminal device, the angular acceleration in a period corresponding to the data of each image frame into shake information;

selecting, by the terminal device from the M image frames, one image frame as a reference image, performing registration on each of M−1 image frames based on the reference image, the shake information, and a preset motion vector table, and performing fusion on the registered images; and compressing, by the terminal device, the fused image to generate a compressed image, and displaying the compressed image.

With reference to the second aspect, in a first implementation manner of the second aspect, the method further includes:

identifying, by the wireless terminal, a current photographing scenario, and determining, based on the current photographing scenario, collection parameters of photographing, where the collection parameters include a quantity M of to-be-collected image frames, exposure time of each image frame, and sensitivity of each image frame; and the step of collecting, by a terminal device, data of M image frames of a photographed object includes: collecting, by the terminal device, the data of the M image frames of the photographed object according to the exposure time, and the sensitivity.

With reference to the first implementation manner of the second aspect, in a second implementation manner of the second aspect, the step of performing, by the terminal device, registration on each of M−1 image frames based on the reference image, the shake information, and a preset motion vector table includes:

calculating, by the terminal device, relative shake information of each of the M−1 image frames relative to the reference image according to the shake information of each of the M−1 image frames and time of each of the M−1 image frames relative to the reference image;

determining a motion vector of each of the M−1 image frames relative to the reference image according to the relative shake information, exposure time of each of the M−1 image frames, and the preset motion vector table; and performing registration on each of the M−1 image frames according to the motion vector.

With reference to the second aspect or the first implementation manner of the second aspect, in a third implementation manner of the second aspect, the terminal device further obtains a depth; and the step of performing, by the terminal device, registration on each of M−1 image frames based on the reference image, the shake information, and a preset motion vector table includes:

performing, by the terminal device, registration on each of the M−1 image frames based on the reference image, the shake information, the depth, and the preset motion vector table.

With reference to the first implementation manner of the second aspect, in a fourth implementation manner of the second aspect, the step of performing, by the terminal device, registration on each of M−1 image frames based on the reference image, the shake information, and a preset motion vector table includes:

calculating, by the terminal device, relative shake information of each of the M−1 image frames relative to the reference image according to the shake information of each of the M−1 image frames and time of each of the M−1 image frames relative to the reference image;

searching for a relative motion vector of each of the M−1 image frames relative to the reference image according to the relative shake information, exposure time of each of the M−1 image frames, and the preset motion vector table;

searching for a motion vector near the relative motion vector based on the relative motion vector; and calculating, based on the relative motion vector and the searched motion vector near the relative motion vector, a matching degree between each of the M−1 image frames and the reference image according to a matching criterion, and performing registration on each of the M−1 image frames based on a motion vector with the highest matching degree.

According to a third aspect, an embodiment of the present invention provides a terminal device, where the terminal device includes a first processor, a central processing unit (CPU), a screen, an image sensor, and a gyro sensor, where:

the image sensor is configured to collect data of M image frames of a photographed object, where M is a positive integer and M≥2;

the first processor is configured to process the data of the M image frames collected by the image sensor, to obtain processed M image frames;

the gyro sensor is configured to: when the terminal device collects data of each of the M image frames of the photographed object, obtain angular acceleration of the terminal device in an X-axis direction, a Y-axis direction, and a Z-axis direction;

the first processor is further configured to process the obtained angular acceleration in a period corresponding to the data of each image frame into shake information;

the central processing unit (CPU) is configured to: select, from the processed M image frames, one image frame as a reference image, perform registration on each of M−1 image frames based on the reference image, the shake information, and a preset motion vector table, and perform fusion on the registered images;

the central processing unit (CPU) is further configured to perform compression processing on the fused image; and the screen is configured to display the compressed image.

With reference to the third aspect, in a first implementation manner of the third aspect, the first processor is further configured to:

identify a current photographing scenario, and determine, based on the current photographing scenario, collection parameters of photographing, where the collection parameters include a quantity M of to-be-collected image frames, exposure time of each image frame, and sensitivity of each image frame.

With reference to the third aspect or the first implementation manner of the third aspect, in a second implementation manner of the third aspect, the first processor is an image signal processor.

With reference to the third aspect, the first implementation manner of the third aspect, or the second implementation manner of the third aspect, in a third implementation manner of the third aspect, that the central processing unit (CPU) is configured to perform registration on each of M−1 image frames based on the reference image, the shake information, and a preset motion vector table is specifically:

the central processing unit is configured to:

calculate relative shake information of each of the M−1 image frames relative to the reference image according to the shake information of each of the M−1 image frames and time of each of the M−1 image frames relative to the reference image;

determine a motion vector of each of the M−1 image frames relative to the reference image according to the relative shake information, exposure time of each of the M−1 image frames, and the preset motion vector table; and perform registration on each of the M−1 image frames according to the motion vector.

With reference to the third aspect, the first implementation manner of the third aspect, or the second implementation manner of the third aspect, in a fourth implementation manner of the third aspect, the terminal device further includes a proximity sensor, where the proximity sensor is configured to obtain a depth.

With reference to the fourth implementation manner of the third aspect, in a fifth implementation manner of the third aspect, that the central processing unit (CPU) is configured to perform registration on each of M−1 image frames based on the reference image, the shake information, and a preset motion vector table is specifically:

the central processing unit (CPU) is configured to perform registration on each of the M−1 image frames based on the reference image, the shake information, the depth, and the preset motion vector table.

With reference to the third aspect, the first implementation manner of the third aspect, or the second implementation manner of the third aspect, in a sixth implementation manner of the third aspect, that the central processing unit (CPU) is configured to perform registration on each of M−1 image frames based on the reference image, the shake information, and a preset motion vector table is specifically:

the central processing unit is configured to:

calculate relative shake information of each of the M−1 image frames relative to the reference image according to the shake information of each of the M−1 image frames and time of each of the M−1 image frames relative to the reference image;

search for a relative motion vector of each of the M−1 image frames relative to the reference image according to the relative shake information, exposure time of each of the M−1 image frames, and the preset motion vector table;

search for a motion vector near the relative motion vector based on the relative motion vector; and calculate, based on the relative motion vector and the searched motion vector near the relative motion vector, a matching degree between each of the M−1 image frames and the reference image according to a matching criterion, and perform registration on each of the M−1 image frames based on a motion vector with the highest matching degree.

According to a fourth aspect, an embodiment of the present invention provides a terminal device, where the terminal device includes a first processor, an image sensor, a gyro sensor, a processor, and a screen, where:

the image sensor is configured to collect data of M image frames of a photographed object, where M is a positive integer and M≥2;

the first processor is configured to process the data of the M image frames collected by the image sensor, to obtain processed M image frames;

the gyro sensor is configured to: when the terminal device collects data of each of the M image frames of the photographed object, obtain angular acceleration of the terminal device in an X-axis direction, a Y-axis direction, and a Z-axis direction;

the processor is configured to process the obtained angular acceleration in a period corresponding to the data of each image frame into shake information;

the first processor is further configured to: select, from the processed M image frames, one image frame as a reference image, perform registration on each of M−1 image frames based on the reference image, the shake information, and a preset motion vector table, and perform fusion on the registered images;

the first processor is further configured to perform compression processing on the fused image; and the screen is configured to display the compressed image.

With reference to the fourth aspect, in a first implementation manner of the fourth aspect, the first processor is further configured to:

determine, based on a identified current photographing scenario, collection parameters of photographing, where the collection parameters include a quantity M of to-be-collected image frames, exposure time of each image frame, and sensitivity of each image frame.

With reference to the third aspect or the first implementation manner of the third aspect, in a second implementation manner of the third aspect, that the first processor is configured to perform registration on each of M−1 image frames based on the reference image, the shake information, and a preset motion vector table is specifically:

the first processor is configured to:

calculate relative shake information of each of the M−1 image frames relative to the reference image according to the shake information of each of the M−1 image frames and time of each of the M−1 image frames relative to the reference image;

determine a motion vector of each of the M−1 image frames relative to the reference image according to the relative shake information, exposure time of each of the M−1 image frames, and the preset motion vector table; and perform registration on each of the M−1 image frames according to the motion vector.

With reference to the fourth aspect, the first implementation manner of the fourth aspect, or the second implementation manner of the fourth aspect, in a third implementation manner of the fourth aspect, the terminal device further includes a proximity sensor, where the proximity sensor is configured to obtain a depth.

With reference to the third implementation manner of the fourth aspect, in a fourth implementation manner of the fourth aspect, that the first processor is configured to perform registration on each of M−1 image frames based on the reference image, the shake information, and a preset motion vector table is specifically:

the first processor is configured to perform registration on each of the M−1 image frames based on the reference image, the shake information, the depth, and the preset motion vector table.

With reference to the fourth aspect or the first implementation manner of the fourth aspect, in a fifth implementation manner of the fourth aspect, that the first processor is configured to perform registration on each of M−1 image frames based on the reference image, the shake information, and a preset motion vector table is specifically:

the first processor is configured to:

calculate relative shake information of each of the M−1 image frames relative to the reference image according to the shake information of each of the M−1 image frames and time of each of the M−1 image frames relative to the reference image;

search for a relative motion vector of each of the M−1 image frames relative to the reference image according to the relative shake information, exposure time of each of the M−1 image frames, and the preset motion vector table;

search for a motion vector near the relative motion vector based on the relative motion vector; and calculate, based on the relative motion vector and the searched motion vector near the relative motion vector, a matching degree between each of the M−1 image frames and the reference image according to a matching criterion, and perform registration on each of the M−1 image frames based on a motion vector with the highest matching degree.

With reference to any one of the fourth aspect, or the first to the fifth implementation manners of the fourth aspect, in a sixth implementation manner of the fourth aspect, the first processor is an application processor.

With reference to any one of the fourth aspect, or the first to the fifth implementation manners of the fourth aspect, in a seventh implementation manner of the fourth aspect, the first processor is an image signal processor.

It can be learned from the foregoing that, in solutions provided in the embodiments of the present invention, a terminal device obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

BRIEF DESCRIPTION OF DRAWINGS

To describe technical solutions in embodiments of the present invention more clearly, the following briefly describes the accompanying drawings. The accompanying drawings in the following description show merely some embodiments of the present invention, and a person of ordinary skill in the art may still derive other drawings from these accompanying drawings without creative efforts.

FIG. 8 is a schematic diagram of a motion vector table according to an embodiment of the present invention;

FIG. 9 is a schematic diagram of a global motion vector table according to an embodiment of the present invention;

DESCRIPTION OF EMBODIMENTS

To make objectives, technical solutions, and advantages of the present invention clearer, the following further describes embodiments of the present invention in detail with reference to the accompanying drawings. All other embodiments obtained by a person of ordinary skill in the art based on the embodiments of the present invention without creative efforts shall fall within the protection scope of the present invention.

It should be noted that a terminal device involved in the embodiments of the present invention may be a device with a camera lens, including but not limited to: a camera (for example, a digital camera), a video camera, a mobile phone (for example, a smartphone), a tablet computer, a personal digital assistant (PDA), a portable device (for example, a portable computer), and a wearable device. The embodiments of the present invention impose no specific limitation on a form of the terminal device.

General Overview:

A terminal device in the embodiments of the present invention may be applied in a photographing process. With the terminal device, an image of high quality is presented to a user after the user finishes photographing, for example, a dynamic range, a signal to noise ratio, definition, or color fidelity of the image is improved.

Figure 1:
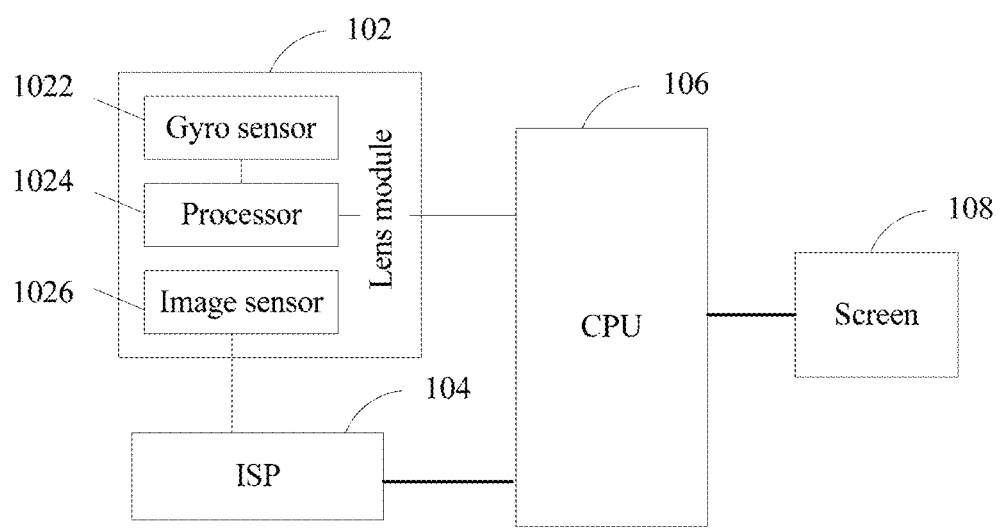
FIG. 1 is a schematic structural diagram of a mobile phone according to an embodiment of the present invention.

Referring to FIG. 1, the terminal device may be a mobile phone. The following uses a mobile phone as an example to describe an embodiment of the present invention.

The mobile phone includes a lens module 102, an image signal processor (ISP) 104, a central processing unit (CPU) 106, and a screen 108. The lens module 102, the ISP 104, the CPU 106, and the screen 108 may be connected by using a bus. The ISP 104 may be configured to determine, based on a current photographing scenario, collection parameters of photographing, such as a quantity of to-be-collected image frames, and exposure time and sensitivity of each image frame. The lens module includes a gyro sensor 1022, a processor 1024, and an image sensor 1026. The image sensor 1026 may be configured to collect data of M image frames of a photographed object according to the collection parameters, where M is a positive integer and M≥2. When the image sensor 1026 collects the data of the M image frames of the photographed object, the gyro sensor 1022 may be configured to: when the terminal device collects data of each of the M image frames of the photographed object, obtain angular acceleration of the mobile phone in an X-axis direction, a Y-axis direction, and a Z-axis direction. The processor 1024 may be configured to process the angular acceleration, obtained by the gyro sensor 1022, in a period corresponding to the data of each image frame into shake information, where the shake information may be used to perform registration on the images collected by the mobile phone. The ISP 104 may further be configured to process the image data collected by the image sensor, to obtain processed images. The CPU 106 may be configured to: select, from the M image frames, one image frame as a reference image, perform registration on each of (M−1) image frames based on the reference image, the shake information, and a preset motion vector table, and perform fusion on the registered images. The CPU 106 may further perform compression processing on the fused image to generate an image in a predetermined format, for example, an image in a JPEG format. The screen may be configured to display the image in the predetermined format.

For example, when performing photographing by using a mobile phone, a user may first start a photographing application on the mobile phone. The photographing application may be an independent photographing application, or a photographing application integrated in another application program, for example, a photographing function in a WeChat application.

After starting the photographing application, the user aims a camera lens of the mobile phone at a to-be-photographed object. The mobile phone may identify a current photographing scenario. For example, the mobile phone may identify a current photographing scenario by means of software calculation and based on a signal transmitted by the image sensor 1026. The identifying a current photographing scenario may be implemented by using the CPU 106, implemented by using the ISP 104, or implemented by using another independent chip apart from the CPU 106 and the ISP 104. This embodiment of the present invention imposes no limitation on a manner of identifying the current photographing scenario. The ISP 104 may determine, based on the identified current photographing scenario, collection parameters of photographing, such as a quantity of to-be-collected image frames of photographing, exposure time of each image frame, and sensitivity of each image frame. The current photographing scenario may be obtained at a moment in a process of starting a photographing application and performing photographing. For example, the current photographing scenario may be obtained at any one of the following moments: when a to-be-photographed object is being focused on; after the to-be-photographed object is focused on and before photographing is performed; or when the mobile phone is moving slightly, for example, when the mobile phone has preliminarily aimed at the to-be-photographed object but has not focused on the object. The mobile phone may perform photographing when a click on a photographing button is detected, or when voice control for triggering photographing is detected, or the like.

Optionally, the mobile phone may not detect a scenario. The ISP 104 may set same collection parameters for all scenarios. The mobile phone may alternatively set corresponding collection parameters for different photographing modes. For example, when a user selects a photographing mode, the ISP 104 has already set collection parameters for this photographing mode. In this case, the mobile phone may not detect a scenario type. The photographing mode refers to an exposure mode, a corresponding aperture, and a corresponding shutter control mode. Common exposure modes include a night shot mode, a portrait shot mode, a landscape shot mode, a full-automatic mode, and the like, which are not limited herein.

After the ISP 104 determines the collection parameters of photographing, the image sensor 1026 collects data of M image frames according to the collection parameters, where M is a positive integer and M≥2. When the mobile phone collects the data of the M image frames of the photographed object, the gyro sensor 1022 may obtain angular acceleration of the mobile phone in an X-axis direction, a Y-axis direction, and a Z-axis direction. The ISP 104 may control and record time for obtaining each image frame. The processor 1024 in the lens module 102 may process the obtained angular acceleration in a period corresponding to each image frame into shake information, where the shake information includes a shake amplitude and a shake frequency. Specifically, the processor 1024 in the lens module 102 may, in combination with the gyro sensor 1022, obtain the angular acceleration of the mobile phone in the X-axis direction, the Y-axis direction, and the Z-axis direction, and exposure time of each image frame, and process the obtained angular acceleration of the mobile phone in the X-axis direction, the Y-axis direction, and the Z-axis direction in the period corresponding to each image frame into the shake information.

Figure 2:
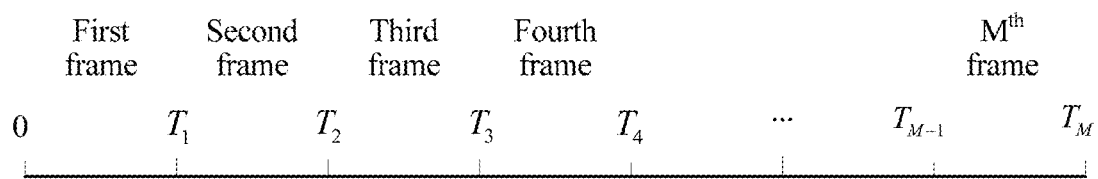
FIG. 2 shows exposure time of image data according to an embodiment of the present invention.

For example, as shown in FIG. 2, the ISP records time 0 to $T_1$ as exposure time for obtaining a first image frame, time $T_1$ to $T_2$ as exposure time for obtaining a second image frame, time $T_2$ to $T_3$ as exposure time for obtaining a third image frame, and by analogy, time $T_{(M-1)}$ to $T_M$ as exposure time for obtaining an $M^{th}$ image frame. In this case, the processor 1024 in the lens module may process angular acceleration obtained by the gyro sensor 1022 in a period from 0 to $T_1$ into shake information of the first image frame, process angular acceleration obtained by the gyro sensor 1022 in a period from $T_1$ to $T_2$ into shake information of the second image frame, process angular acceleration obtained by the gyro sensor 1022 in a period from $T_2$ to $T_3$ into shake information of the third image frame, and by analogy, process angular acceleration obtained by the gyro sensor 1022 in a period from time $T_{(M-1)}$ to $T_M$ into shake information of the $M^{th}$ image frame.

After the image sensor 1026 collects the data of the M image frames, the ISP 104 may process the data of the M image frames to obtain processed M image frames. Specifically, when collecting the M image frames, the image sensor 1026 receives a refracted optical signal, and may generate M frames of digital images in a RAW format, that is, the data of the M image frames that is not processed. The ISP 104 may process the data of the M image frames in the RAW format, and generate data of M image frames in a YUV format or an RGB format, that is, M image frames that are obtained by means of processing by the ISP 104. That the ISP 104 processes the image data in the RAW format into image data in a YUV format or an RGB format may include one or more of: defect pixel correction, white balance, sharpness, interpolation, correction, or the like.

After obtaining the M image frames processed by the ISP 104, the CPU 106 may select one of the M image frames as a reference image. The selected reference image may be the first image frame, may be one image frame of the M image frames with a clearest characteristic of the photographed object, or may be one image frame of the M image frames that is randomly selected or determined according to a specified algorithm. This embodiment of the present invention imposes no limitation on a specific reference image selection manner.

After the reference image is selected, the CPU 106 performs registration on each of the other (M−1) image frames based on the reference image. The CPU 106 may perform registration on each of the other (M−1) image frames according to the reference image, the shake information obtained by the processor 1024, and a preset motion vector table, where the motion vector table may be stored in a memory.

For example, the CPU 106 may calculate relative shake information of each of the (M−1) image frames relative to the reference image according to shake information, obtained by means of processing by the processor 1024, of each of the (M−1) image frames and exposure time of each of the (M−1) image frames relative to the reference image; determine a motion vector of each of the (M−1) image frames relative to the reference image according to the relative shake information, the exposure time of each of the (M−1) image frames, and the preset motion vector table; and perform registration on each of the (M−1) image frames according to the motion vector.

A specific method for determining the relative shake information may be as follows:

For example, FIG. 2 is used as an example for description. If the second image frame is selected as the reference image, relative shake information of the first image frame relative to the reference image is shake information obtained by the processor 1024 in the lens module 102 in a period from $T_2$ to $T_1$ according to angular acceleration, obtained by the gyro sensor 1022, of the mobile phone in the X-axis direction, the Y-axis direction, and the Z-axis direction, that is, the shake information in the period from $T_2$ to $T_1$, which also means an opposite value of a vector value of shake information of the second image frame. Relative shake information of the third image frame relative to the reference image is shake information obtained by the processor 1024 in a period from $T_2$ to $T_3$ according to angular acceleration, obtained by the gyro sensor 1022, of the mobile phone in the X-axis direction, the Y-axis direction, and the Z-axis direction, that is, a vector value of shake information of the third image frame.

By analogy, relative shake information of the $M^{th}$ image frame relative to the reference image is shake information in $T_2$ to $T_M$, that is, superposition of vector values of shake information from the third image frame to the $M^{th}$ image frame.

Specifically, a method for obtaining the preset motion vector table may be:

(1) First determine a calibration image. A calibration image shown in FIG. 3 may be selected, where the calibration image includes small black grids and white lines, and the small black grids are divided by the white lines. The calibration image is divided into N areas, where N is a positive integer. Each area may include four small black grids, one horizontal white line, and one vertical white line, where every two of the four grids are adjacent to each other, and the two lines constitute a cross. A specific division method may be shown in FIG. 3 by using dashed lines. In a specific photographing process, a mobile phone is used as an example. The mobile phone is placed on a photographing table, the photographing table is fastened, and the calibration image is photographed in a stationary state. Widths of the horizontal and vertical white lines in the N areas of the photographed image are separately calculated. For example, as shown in FIG. 4, in an area i(1≤i≤N) that is, an i(1≤i≤N)th area, the widths of the horizontal and vertical white lines may be represented by $(WH)_i$ and $(WV)_i$ respectively.

(2) The photographing table may simulate a hand tremble that occurs when a person performs photographing. Set vibration parameters for the photographing table, so that the mobile phone placed on the photographing table may shake. Therefore, the vibration parameters of the photographing table may be set, so that the mobile phone photographs the calibration image to obtain a photographed image of the calibration image when exposure time set by the ISP 104 of the mobile phone is T0, a shake amplitude is M0, and a shake frequency is F0. A part of the photographed image, for example, an image of the i(1≤i≤N)th area, may be shown in FIG. 5. Optionally, the specified vibration parameters of the photographing table may further include a photographing depth; that is, the mobile phone photographs the calibration image to obtain the photographed image of the calibration image when the exposure time set by the ISP of the mobile phone is T0, the shake amplitude is M0, the shake frequency is F0, and the depth is D0. The photographing depth, a depth for short, refers to a distance between the mobile phone that is performing photographing and the photographed object.

Figure 5:
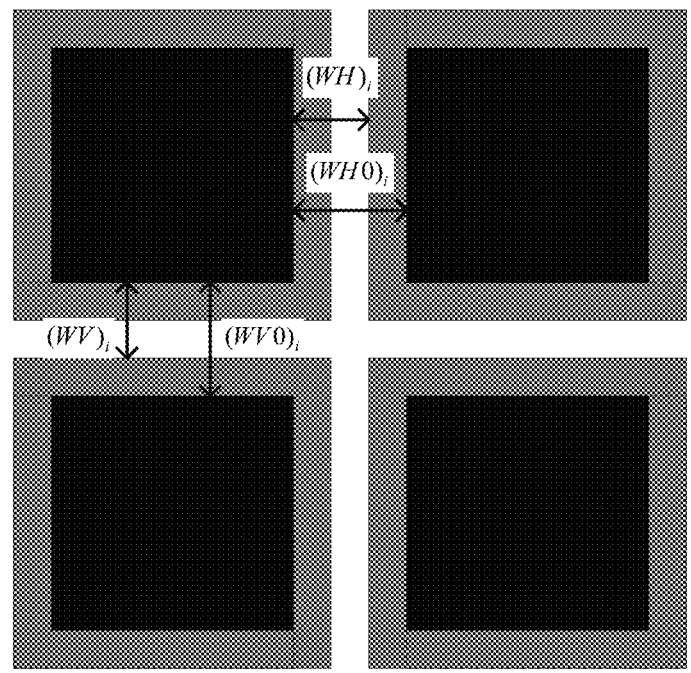
FIG. 5 shows some images photographed in a shake state according to an embodiment of the present invention.
Figure 6:
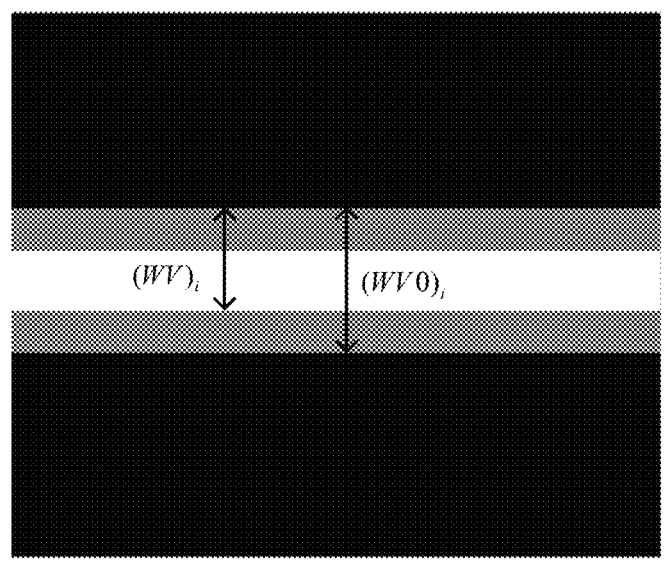
FIG. 6 shows some images that are in a vertical direction and that are of images photographed in a shake state according to an embodiment of the present invention.
Figure 7:
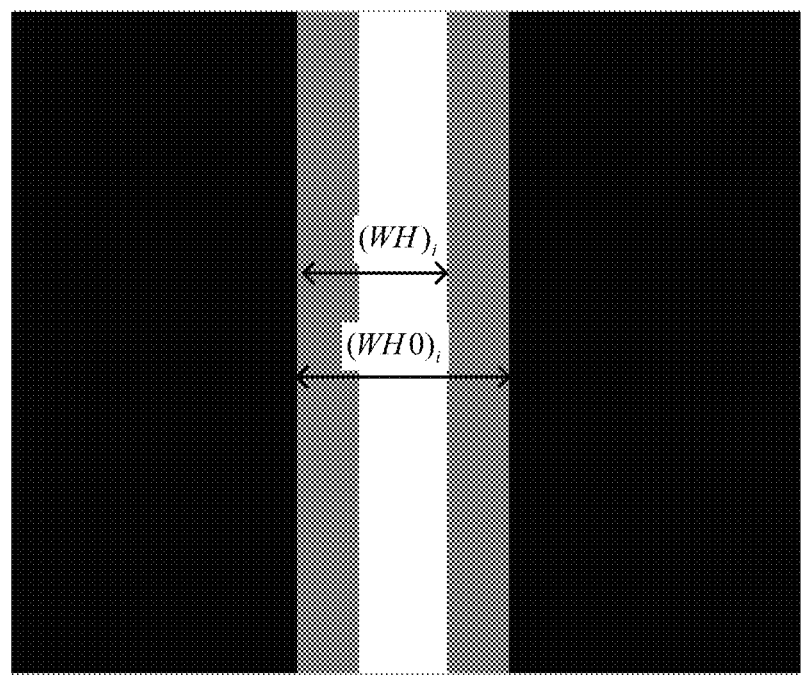
FIG. 7 shows some images that are in a horizontal direction and that are of images photographed in a shake state according to an embodiment of the present invention.

(3) For ease of description, FIG. 5 is decomposed into FIG. 6 and FIG. 7, where FIG. 5 is an image of the i(1≤i≤N)th area, and FIG. 6 and FIG. 7 are some captured images. As shown in FIG. 6, in a vertical direction, a distance between two gray boundaries is $(WV0)_i$, and a vertical motion vector $(WVV0)_i$ of pixels corresponding to this area is:

$$(WVV0)_i = (WV0)_i - (WV)_i;$$

$(WV)_i$ is a width of the vertical white line in the i(1≤i≤N)th area of the photographed image that is obtained by photographing the calibration image in a stationary state.

If the lens module used for photographing is an OIS lens module, after a shake is detected, a compensation lens group in the lens module performs compensation according to a shake status of the lens. In this case, the vertical motion vector (WVV0) of the pixels corresponding to this area is:

$$(WVV0)_i = (WV0)_i - (WV)_i - (OISV)_i;$$

$(OISV)_i$ is an amount of vertical compensation of the OIS lens module in the i(1≤i≤N)th area; $(WV)_i$ is the width of the vertical white line in the i(1≤i≤N)th area of the photographed image that is obtained by photographing the calibration image in a stationary state.

Likewise, as shown in FIG. 7, in a horizontal direction, a calculated distance between two gray boundaries is $(WH0)_i$, and a horizontal motion vector $(WVH0)_i$ of pixels corresponding to this area is:

$$(WVH0)_i = (WH0)_i - (WH)_i;$$

$(WH)_i$ is a width of the horizontal white line in the i(1≤i≤N)th area of the photographed image that is obtained by photographing the calibration image in a stationary state.

If the lens module used for photographing is an OIS lens module, the horizontal motion vector $(WVH0)_i$ of the pixels corresponding to this area is:

$$(WVH0)_i = (WH0)_i - (WH)_i - (OISH)_i;$$

$(OISH)_i$ is an amount of horizontal compensation of the OIS lens module in the i(1≤i≤N)th area; $(WH)_i$ is the width of the horizontal white line in the i(1≤i≤N)th area of the photographed image that is obtained by photographing the calibration image in a stationary state.

Optionally, the vibration parameters set for the photographing table may further include a depth. That is, the mobile phone may obtain a photographed image of the calibration image when the exposure time is T0, the shake amplitude is M0, the shake frequency is F0, and the depth is D0. Different depths may lead to different horizontal and vertical motion vectors of pixels corresponding to each area. For example, if the distance between two vertical gray boundaries in the i(1≤i≤N)th area of a photographed image of the calibration image is $(WH0)_i$, the vertical motion vector $(WVV0)_i$ of the pixels corresponding to this area is: $(WVV0)_i = (WV0)_i - (WV)_i$, where the photographed image of the calibration image is obtained by the mobile phone when the exposure time is T0, the shake amplitude is M0, the shake frequency is F0, and the depth is D0; or if the distance between two vertical gray boundaries in the i(1≤i≤N)th area of a photographed image of the calibration image is $(WH0)'_i$, the vertical motion vector $(WVV0)'_i$ of the pixels corresponding to this area is: $(WVV0)'_i = (WV0)'_i - (WV)_i$, where the photographed image of the calibration image is obtained by the mobile phone when the exposure time is T0, the shake amplitude is M0, the shake frequency is F0, and the depth is D0'. Because $(WH0)_i$ and $(WH0)'_i$ may be different, $(WVV0)_i$ and $(WVV0)'_i$ may be different. That is, the obtained vertical motion vectors of the pixels corresponding to the i(1≤i≤N)th area may be different in a case of same exposure time, a same shake amplitude, a same shake frequency, but different depths. Likewise, horizontal motion vectors of the pixels corresponding to the i(1≤i≤N)th area may be different.

Figure 3:
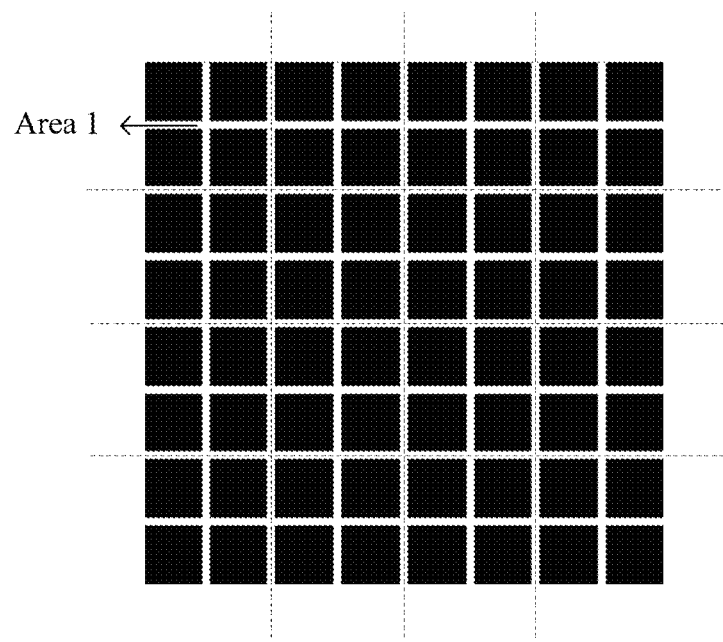
FIG. 3 is a calibration diagram according to an embodiment of the present invention.
Figure 4:
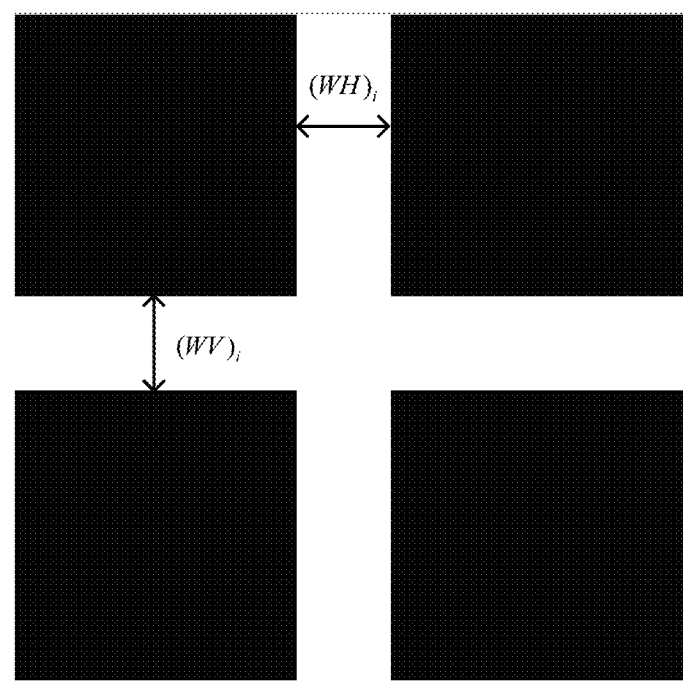
FIG. 4 shows some images photographed in a stationary state according to an embodiment of the present invention.

(4) For each area of the image shown in FIG. 3, a motion vector table (MVT) of the image is obtained, by performing operations as described in (3), when the shake amplitude of the mobile phone is M0, the shake frequency is F0, and the exposure time is T0. Alternatively, an MVT of an image may be obtained when the shake amplitude of the mobile phone is M0, the shake frequency is F0, the depth is D0, and the exposure time is T0.

When the shake is relatively strong, not all motion vectors of areas in the image are the same; in this case, the motion vector table of the image may be referred to as a local motion vector table (LMVT). When the shake amplitude is relatively small, and the exposure time is relatively short, motion vectors of all areas in the image are the same; in this case, the motion vector table of the image is referred to as a global motion vector table (GMVT).

(5) Different vibration parameters are set for the photographing table, so that the mobile phone photographs the calibration image in FIG. 3 in a case of different shake amplitudes, different shake frequencies, and different exposure time. A motion vector table of the image in a case of different pieces of shake information and different exposure time may be obtained by performing operations as described in (3) and (4). Alternatively, different vibration parameters may be set for the photographing table, so that the mobile phone photographs the calibration image in FIG. 3 in a case of different shake amplitudes, different shake frequencies, different exposure time, and different depths. A motion vector table of the image in a case of different pieces of shake information, different exposure time, and different depths may be obtained by performing operations as described in (3) and (4), as listed in FIG. 8. If the motion vector table is a global motion vector table, the motion vector table in FIG. 8 may also be represented as a motion vector table listed in FIG. 9.

After determining the reference image and the relative shake information of each of the other (M−1) image frames, the CPU 106 searches the preset motion vector table according to the relative shake information and exposure time of each of the (M−1) image frames to obtain horizontal and vertical motion vectors of N areas of each of the (M−1) image frames relative to the reference image. The CPU 106 performs motion registration on each of the (M−1) image frames based on the reference image and the horizontal and vertical motion vectors obtained by searching the preset motion vector table.

Optionally, the mobile phone may further detect a depth, and searches the preset motion vector table according to the relative shake information, the depth, and the exposure time of each of the (M−1) image frames to obtain the horizontal and vertical motion vectors of the N areas of each of the (M−1) image frames relative to the reference image. A method used by the mobile phone to detect the depth may be implemented in multiple manners, for example, detecting the distance between the mobile phone and the photographed object, that is, the depth, by using a proximity sensor; or calculating the depth by using image data collected by multiple cameras. This embodiment of the present invention imposes no limitation on a manner of implementing the depth detection method.

In another optional implementation manner, the CPU 106 may alternatively first perform determining the relative shake information. For example, the CPU 106 may first determine whether relative shake information of an image frame relative to the reference image is less than a threshold. If the relative shake information of the image frame is less than the threshold, a shake of the mobile phone may be considered as a simple translational movement, and the CPU 106 may select, from a global motion vector table, a global motion vector of a whole image frame to perform overall registration on the image frame. If the relative shake information of the image frame is not less than the threshold, the CPU 106 selects, from a local motion vector table, motion vectors corresponding to N areas to perform registration on the image frame. The shake information includes a shake amplitude and a shake frequency. The determining, by the CPU 106, whether the shake information is less than the threshold may be: determining whether the shake amplitude is less than an amplitude threshold and whether the shake frequency is less than a frequency threshold, or determining whether both the shake amplitude and the shake frequency are less than a threshold. A manner in which the CPU 106 determines whether shake information of an image frame is less than a threshold may depend on a specific case, which is not limited herein.

Optionally, the performing, by the CPU 106, registration on each of the (M−1) image frames based on the reference image, the shake information, and a preset motion vector table may be implemented in another manner.

For example, after the CPU 106 calculates the relative shake information of each of the (M−1) image frames relative to the reference image according to the shake information, obtained by means of processing, of each of the (M−1) image frames and time of each of the (M−1) image frames relative to the reference image, for each of the (M−1) image frames that needs to be registered, for example, any image frame, the CPU 106 first searches for a relative motion vector of the image frame relative to the reference image according to relative shake information and exposure time of the image frame, and the preset motion vector table. Then, the CPU 106 performs translation on the image frame based on the relative motion vector. For the translated image, another position nearby is searched by using the translated position as a start point and based on a specific search rule, and a matching degree of the image frame relative to the reference image is calculated based on the start point and the searched another position. A position with the highest matching degree is selected for registration, so as to further improve registration accuracy. Specifically, a block matching algorithm may be used. A position near a start point of each of the (M−1) image frames is searched based on a specific motion vector, and a matching degree of each of the (M−1) image frames relative to the reference image is calculated based on the start point and the searched position. Available matching criteria for measuring a matching degree include one or more of: a mean absolute difference function (MAD), the sum of absolute difference (SAD), a normalized correlation function (NCFF), a mean square error function (MSE), a minimized maximum error function (MME), and matching-pixel count (MPC). This embodiment of the present invention imposes no limitation on a matching criterion. Optionally, in a specific implementation process, the CPU may first perform translation on each of the (M−1) image frames, sequentially searches another position near a start point of each image frame, calculates, based on the start point or the searched another position, a matching degree of the image frame relative to the reference image, and selects a position with the highest matching degree for registration. Alternatively, the CPU 106 may first perform translation on one of the (M−1) image frames, and searches another position near the image frame by using a current position to which the image frame is translated as a start point, calculates, based on the start point and the searched another position, a matching degree of the image frame relative to the reference image, selects a position with the highest matching degree for registration, translates a next image frame, and performs the foregoing processing, which is not described herein again.

If the shake is relatively strong, not all motion vectors of N areas of each image frame that are registered relative to the reference image are the same. After the motion vectors of the N areas of each image frame are obtained by searching the table, reference may be made to the foregoing method: Another position near a start point of each area of the N areas is separately searched according to the block matching algorithm, a matching degree relative to the reference image is calculated based on the start point of each area of the N areas and the searched another position, and a motion vector with the highest matching degree is selected to perform motion registration on each area of the N areas.

After performing registration based on the reference image, the CPU 106 may fuse the registered M image frames into one image frame. Optionally, the CPU 106 may use different fusion methods to perform fusion on the registered the M image frames according to detected scenarios.

For example, if a detected scenario is night scenario, or another scenario in which light is relatively weak, the mobile phone may perform fusion on multiple image frames by using a weighted average method. Weights of fusion may be the same or may be different; weights of N areas of the fused image may be the same, or weights of local areas may be adjusted according to local content of the image. Optionally, compared with a mobile phone with a common lens module, exposure time of M image frames collected by the mobile phone with an OIS lens module may be longer under a same shake blur amount. Therefore, in a night scenario, with same exposure time, effects of images collected by the mobile phone with the OIS lens module may be better.

If a detected scenario is outdoors, or another scenario in which light is relatively sufficient and contrast is relatively high, when collecting images, the mobile phone may collect multiple image frames with different exposure time. In this case, the mobile phone may perform fusion on M image frames by using a fusion method of high dynamic range (HDR) fusion, so as to improve a dynamic range of the scenario, and recover detail information and color information of bright and dark areas of the images. Optionally, compared with a mobile phone with a common lens module, exposure ranges of M image frames collected by the mobile phone with an OIS lens module may be larger under a same shake blur amount, and therefore, quality of a combined image may be higher.

After fusing the registered M image frames into one image frame, the CPU 106 may perform compression processing on the fused image to generate an image in a predetermined format, for example, an image in a JPEG format. Specifically, the image that is obtained by means of fusion by the CPU 106 may be an image in a YUV format or an RGB format. The CPU 106 may perform compression processing on the image in the YUV format or the RGB format by using a preset compression algorithm, to process the image in the YUV format or the RGB format into an image in a predetermined format, for example, an image in a JPEG format.

The screen 108 may display the compressed image.

It should be noted that the CPU 106 may be an application processor of the mobile phone. The ISP 104 and the CPU 106 may be integrated as a whole. For example, a function of the ISP 104 may be set in the CPU 106.

Alternatively, the CPU 106 and the processor 1024 may be integrated as a whole, or the ISP 104 and the processor 1024 may be integrated as a whole. Optionally, the CPU 106, the ISP 104, and the processor 1024 may alternatively be integrated as a whole.

It should be understood that, the figure shows only a basic connection relationship between components used for implementing solutions of this embodiment of the present invention. There may alternatively be another connection relationship between the components. For example, the image sensor 1026 may be connected to the gyro sensor 1022 or the processor 1024, and the processor 1024 may also be connected to the ISP 104.

It can be learned from the foregoing that the terminal device provided in this embodiment of the present invention obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

Method Embodiments

Figure 10:
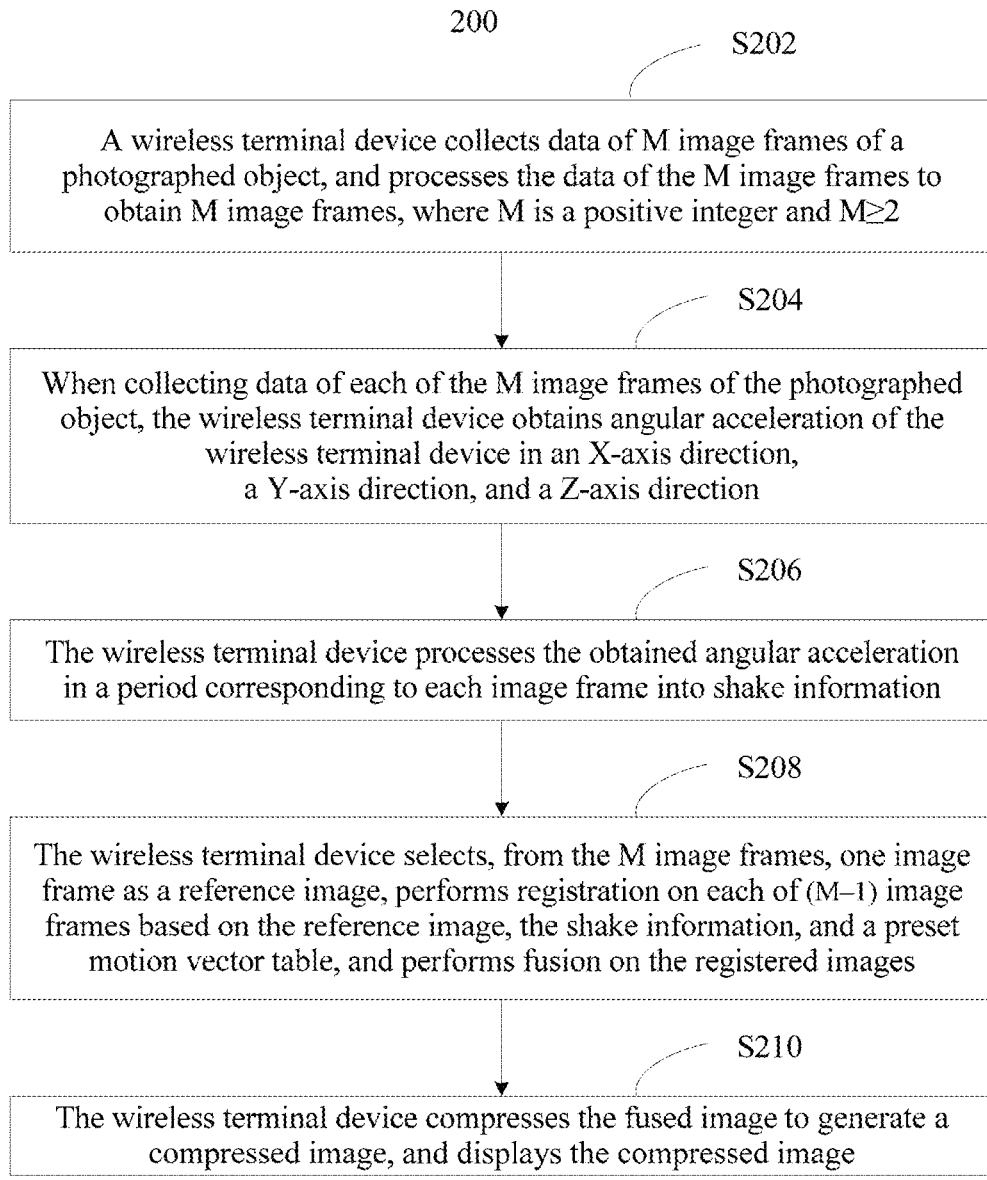
FIG. 10 is a schematic flowchart of a photographing method according to an embodiment of the present invention.

As shown in FIG. 10, an embodiment of the present invention provides a photographing method, where the method 200 includes the following steps.

S202. A terminal device collects data of M image frames of a photographed object, and processes the data of the M image frames to obtain M image frames, where M is a positive integer and M≥2.

An image sensor of the terminal device may collect the data of the M image frames of the photographed object according to specified collection parameters, where the collection parameters may include a quantity M of to-be-collected image frames, exposure time of each image frame, and sensitivity of each image frame. In an image data collection process, the image sensor of the terminal device receives an optical signal, and may generate M frames of digital images in a RAW format, that is, the data of the M image frames that is not processed. The terminal device may process the data of the M image frames in the RAW format to generate data of M image frames in a YUV format or an RGB format, that is, M image frames that are obtained by the terminal device by means of collection and processing.

S204. When collecting data of each of the M image frames of the photographed object, the terminal device obtains angular acceleration of the terminal device in an X-axis direction, a Y-axis direction, and a Z-axis direction.

The terminal device includes a gyro sensor. The gyro sensor may obtain angular acceleration, at any time, of the terminal device in the X-axis direction, the Y-axis direction, and the Z-axis direction. When the image sensor collects the data of the M image frames of the photographed object, the gyro sensor may obtain the angular acceleration of the terminal device in the X-axis direction, the Y-axis direction, and the Z-axis direction.

S206. The terminal device processes the obtained angular acceleration in a period corresponding to the data of each image frame into shake information.

The terminal device may process, according to the exposure time of each image frame when collecting the data of the M image frames, the angular acceleration, obtained by the gyro sensor, of the terminal device in the X-axis direction, the Y-axis direction, and the Z-axis direction into shake information of each image frame.

It should be understood that, there is no obvious time sequence for S206 and the S202 of obtaining the M image frames by means of processing by the terminal device, and the two steps may be executed separately. That is, S206 may be executed simultaneously with the S202 of obtaining the M image frames by means of processing by the terminal device, S206 may be executed before the S202 of obtaining the M image frames by means of processing by the terminal device, or S206 may be executed after the S202 of obtaining the M image frames by means of processing by the terminal device.

S208. The terminal device selects, from the M image frames, one image frame as a reference image, performs registration on each of (M−1) image frames based on the reference image, the shake information, and a preset motion vector table, and performs fusion on the registered images.

The terminal device selects, from the processed M image frames, one image frame as the reference image. The reference image may be the first image frame, may be one image frame of the M image frames with a clearest characteristic of the photographed object, or may be one image frame of the M image frames that is randomly selected or determined according to a specified algorithm. This embodiment of the present invention imposes no limitation on a specific reference image selection manner.

After selecting the reference image, the terminal device calculates relative shake information of each of the (M−1) image frames relative to the reference image according to shake information, obtained by means processing, of each of the other (M−1) image frames and time of each of the (M−1) image frames relative to the reference image. For a specific calculation method, reference may be made to the "General overview" part, and details are not described herein again.

The terminal device may determine a motion vector of each of the (M−1) image frames relative to the reference image according to the relative shake information obtained by means of calculation, the exposure time of each of the (M−1) image frames, and the preset motion vector table.

Optionally, the terminal device may further obtain a depth. The terminal device may determine a motion vector of each of the (M−1) image frames relative to the reference image according to the relative shake information obtained by means of calculation, the exposure time of each of the (M−1) image frames, the depth, and the preset motion vector table.

The terminal device performs registration on each of the (M−1) image frames according to the determined motion vectors.

Optionally, the performing, by the terminal device, registration on each of (M−1) image frames based on the reference image, the shake information, and a preset motion vector table may include:

calculating, by the terminal device, relative shake information of each of the (M−1) image frames relative to the reference image according to shake information, obtained by means of processing, of each of the (M−1) image frames other than the reference image, and time of each of the (M−1) image frames relative to the reference image;

searching for a relative motion vector of each of the (M−1) image frames relative to the reference image according to the relative shake information, exposure time of each of the (M−1) image frames, and the preset motion vector table;

searching for a motion vector near the relative motion vector based on the relative motion vector; and calculating, based on the relative motion vector and the searched motion vector near the relative motion vector, a matching degree between each of the (M−1) image frames and the reference image according to a matching criterion, and performing registration on each of the (M−1) image frames based on a motion vector with the highest matching degree.

There may be multiple manners for obtaining the preset motion vector table. Reference may be made to the description in the "General overview" part.

After registration, the terminal device may perform fusion on the registered M image frames, to fuse the M image frames into one image frame. The fused image may be an image in a YUV format or an RGB format.

S210. The terminal device compresses the fused image to generate a compressed image, and displays the compressed image.

The terminal device may perform compressing processing on the fused image in the YUV format or the RGB format by using a preset compression algorithm, to generate a compressed image in a predetermined format, for example, an image in a JPEG format.

The terminal device displays the compressed image.

In an optional embodiment of the present invention, before S202, the photographing method may further include:

identifying, by the terminal device, a current photographing scenario, and determining, based on the current photographing scenario, collection parameters of photographing, where the collection parameters may include a quantity M of to-be-collected image frames, exposure time of each image frame, and sensitivity of each image frame.

S202 may specifically include: collecting, by the terminal device, the data of the M image frames of the photographed object according to the exposure time and the sensitivity.

Optionally, in S208, the performing fusion on the registered images by the terminal device may be specifically: selecting, by the terminal device according to the identified current photographing scenario, a corresponding fusion method to perform fusion on the M image frames. For a specific fusion method, reference may be made to the "General overview" part.

It can be learned from the foregoing that, according to a photographing method provided in this embodiment of the present invention, a terminal device obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

Apparatus Embodiments

Figure 11:
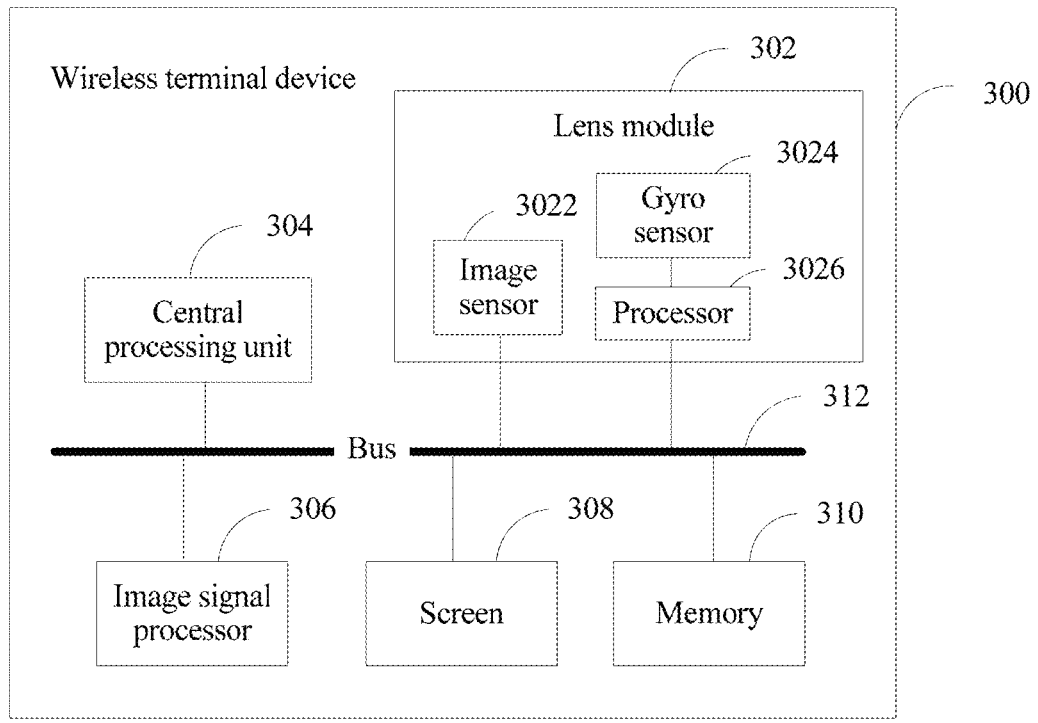
FIG. 11 is a possible schematic structural diagram of a terminal device according to an embodiment of the present invention.

As shown in FIG. 11, an embodiment of the present invention provides a terminal device. The terminal device 300 may include: a lens module 302, a central processing unit 304, an image signal processor 306, a screen 308, and a bus 312. The terminal device may further include a memory 310. The lens module 302, the central processing unit 304, the image signal processor 306, the screen 308, and the memory 310 may be connected by using the bus 312.

In this embodiment, the lens module 302 includes an image sensor 3022, a gyro sensor 3024, and a processor 3026. The image sensor 3022, which is also referred to as a photosensitive element, is a device that converts an optical image to an electronic signal, and is widely used in a digital camera and other electro-optical devices. Currently, image sensors mainly fall into two types: a charge-coupled device (CCD) and a complementary metal-oxide-semiconductor (CMOS) active pixel sensor. The terminal device may collect image data by using the image sensor 3022. The gyro sensor 3024 is an apparatus used for sensing and maintaining a direction, and is designed based on a theory of conservation of angular momentum. The gyro sensor is mainly constituted by a rotatable rotor located in an axis center, and may obtain angular acceleration of the terminal device in an X-axis direction, a Y-axis direction, and a Z-axis direction. The processor 3026 may be configured to process the angular acceleration obtained by the gyro sensor 3024. Specifically, the processor 3026 may calculate, based on exposure time of each image frame and the angular acceleration, obtained by the gyro sensor 3024, of the terminal device in the X-axis direction, the Y-axis direction, and the Z-axis direction, shake information when the terminal device collects image data of each image frame.

The central processing unit 304 is a control center of the terminal device, and is connected to each part of the entire terminal device by using various interfaces and lines. The central processing unit 304 implements various functions of the terminal device, and/or processes data by running or executing a software program and/or a module that is stored in the memory and by invoking data stored in the memory. The central processing unit 304 may be constituted by an integrated circuit, for example, may be constituted by a single packaged integrated circuit, or may be constituted by multiple packaged integrated circuits with a same function or different functions that are connected.

The image signal processor 306 may be a dedicated digital integrated circuit that performs processing such as defect pixel correction, white balance, sharpness, correction, or color interpolation on the image data output by the image sensor 3022, to obtain processed digital images. In this embodiment of the present invention, the image signal processor 306 may process image data in a RAW format into image data in a YUV format or an RGB format. The image signal processor 306 may further set parameters used for collecting an image, such as a quantity of to-be-collected image frames, exposure time of each image frame, and sensitivity of each image frame, where the parameters are used to control the image sensor 3022 to collect image data.

The memory 310 may be configured to store a software program and data information. The memory mainly includes a program storage area and a data storage area. The program storage area may store an operating system, and an application program required by at least one function, such as a photographing program. The data storage area may store data, a motion vector table, and the like that are created according to use of the terminal device.

The screen 308 may be configured to display a text, an image, and/or a video. The screen may include a display panel, for example, a display panel disposed in a form of an LCD (liquid crystal display), an OLED (organic light-emitting diode), an FED (field emission display), or the like. Alternatively, the screen may include a reflective display, for example, an electrophoretic display, or a display that uses an interferometric modulation of light technology.

Specifically, in an embodiment of the terminal device, the terminal device includes: the image sensor 3022, the gyro sensor 3024, the processor 3026, the image signal processor 306, the central processing unit 304, and the screen 308, where:

the image sensor 3022 may be configured to collect data of M image frames of a photographed object, where M is a positive integer and M≥2;

the gyro sensor 3024 may be configured to: when the terminal device collects data of each of the M image frames of the photographed object, obtain angular acceleration of the terminal device in an X-axis direction, a Y-axis direction, and a Z-axis direction;

the processor 3026 may be configured to process the obtained angular acceleration in a period corresponding to the data of each image frame into shake information;

the image signal processor 306 may be configured to process the image data collected by the image sensor 3022, to obtain processed M image frames;

the central processing unit 304 may be configured to:

select, from the processed M image frames, one image frame as a reference image; and perform registration on each of processed (M−1) image frames based on the reference image, the shake information, and a preset motion vector table, and perform fusion on the registered images; and the screen 308 is configured to display the fused image.

Optionally, the central processing unit 304 is further configured to perform compression processing on the fused image to generate a compressed image in a predetermined format, for example, an image in a JPEG format; and the screen 308 is specifically configured to display the compressed image in the predetermined format, that is, the image that is obtained by means of compression processing after fusion is performed.

In an optional implementation manner, that the central processing unit 304 performs registration on each of (M−1) image frames based on the reference image, the shake information, and a preset motion vector table includes:

calculating, by the central processing unit 304, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, and the preset motion vector table; and performing registration on each of the (M−1) image frames according to the motion vector.

In an optional implementation manner, the terminal device further includes a proximity sensor, where the proximity sensor is configured to obtain a depth.

That the central processing unit 304 performs registration on each of (M−1) image frames based on the reference image, the shake information, and a preset motion vector table includes:

performing, by the central processing unit 304, registration on each of the (M−1) image frames based on the reference image, the shake information, the depth, and the preset motion vector table; that is:

calculating, by the central processing unit 304, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, the depth, and the preset motion vector table; and performing registration on each of the (M−1) image frames according to the motion vector.

In an optional implementation manner, that the central processing unit 304 performs registration on each of (M−1) image frames based on the reference image, the shake information, and a preset motion vector table includes:

calculating, by the central processing unit 304, relative shake information of each of the (M−1) image frames relative to the reference image according to the shake information, obtained by means of processing, of each of the (M−1) image frames and time of each of the (M−1) image frames relative to the reference image;

searching for a relative motion vector of each of the (M−1) image frames relative to the reference image according to the relative shake information, exposure time of each of the (M−1) image frames, and the preset motion vector table;

searching for a motion vector near the relative motion vector based on the relative motion vector; and calculating, based on the relative motion vector and the searched motion vector near the relative motion vector, a matching degree between each of the (M−1) image frames and the reference image according to a matching criterion, and performing registration on each of the (M−1) image frames based on a motion vector with the highest matching degree.

Specifically, the central processing unit 304 performs registration on each of (M−1) image frames based on the reference image, the shake information, and a preset motion vector table. Reference may be made to the "General overview" part, and details are not described herein again.

Optionally, before the image sensor 3022 collects data of M image frames, the terminal device may further identify a current photographing scenario. The identifying a current photographing scenario may be implemented by using the central processing unit 304, implemented by using the image signal processor 306, or implemented by using another independent chip apart from the central processing unit 304 and the image signal processor 306. This embodiment of the present invention imposes no limitation on a manner of identifying the current photographing scenario.

The image signal processor 306 may determine, based on the identified current photographing scenario, collection parameters of photographing, where the collection parameters include a quantity M of to-be-collected image frames, exposure time of each image frame, and sensitivity of each image frame; and the collecting, by the image sensor 3022, data of M image frames specifically includes: collecting, by the image sensor 3022, the data of the M image frames of the photographed object according to the exposure time and the sensitivity.

Optionally, the performing, by the central processing unit 304, fusion on the registered images may be specifically: performing, by the central processing unit 304 according to the identified current photographing scenario, fusion on the M image frames. For a specific fusion method, reference may be made to the "General overview" part, and details are not described herein again.

Optionally, in the foregoing terminal device, the image signal processor 306 and the central processing unit 304 may be integrated as a whole, that is, one processor is used to implement functions of the image signal processor 306 and the central processing unit 304; or, in the foregoing terminal device, the central processing unit 304 and the processor 3026 may be integrated as a whole, that is, one processor is used to implement functions of the central processing unit 304 and the processor 3026; or, in the foregoing terminal device, the image signal processor 306 and the processor 3026 may be integrated as a whole, that is, one processor is used to implement functions of the image signal processor 306 and the central processing unit 304.

It should be noted that the terminal device may be a mobile phone, and the central processing unit 304 may be an application processor.

It can be learned from the foregoing that the terminal device provided in this embodiment of the present invention obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

Figure 12:
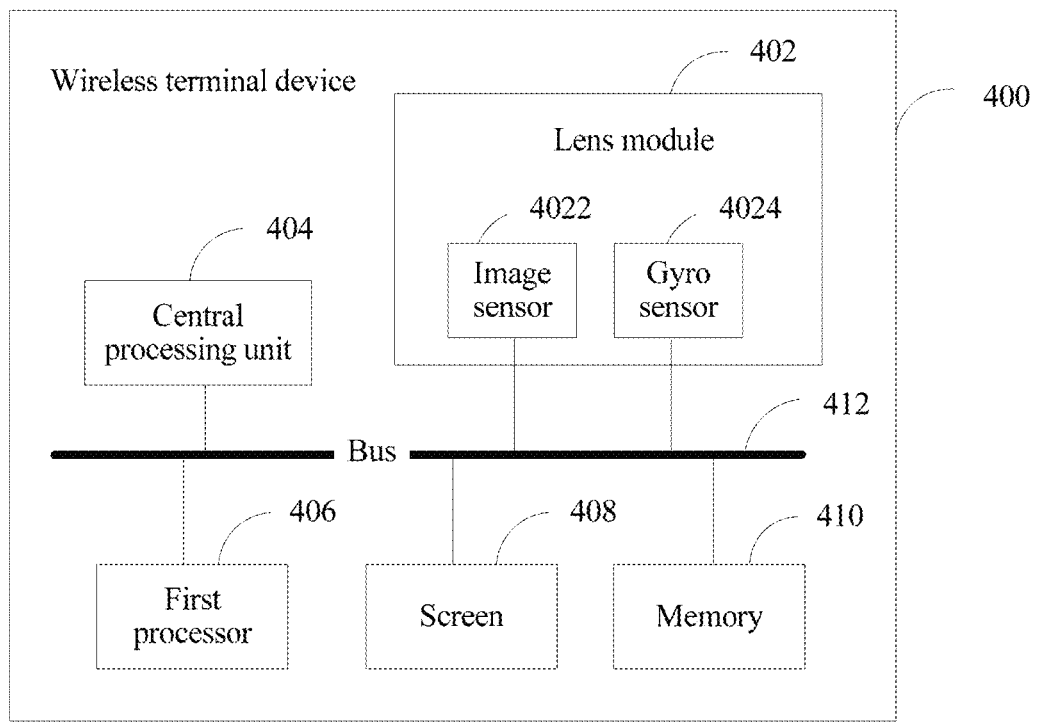
FIG. 12 is another possible schematic structural diagram of a terminal device according to an embodiment of the present invention.

As shown in FIG. 12, an embodiment of the present invention provides a terminal device. The terminal device 400 includes: a lens module 402, a central processing unit 404, a first processor 406, a screen 408, and a bus 412. The terminal device may further include a memory 410. The lens module 402, the central processing unit 404, the first processor 406, the screen 408, and the memory 410 may be connected by using the bus 412.

In this embodiment, the lens module 402 includes an image sensor 4022 and a gyro sensor 4024. The image sensor 4022 may be configured to collect image data. The gyro sensor 4024 may be configured to obtain angular acceleration of the terminal device in an X-axis direction, a Y-axis direction, and a Z-axis direction.

The first processor 406 may be configured to process the angular acceleration obtained by the gyro sensor 4024. Specifically, the first processor 406 may process, based on exposure time of each image frame and the angular acceleration, obtained by the gyro sensor 4024, of the terminal device in the X-axis direction, the Y-axis direction, and the Z-axis direction, the obtained angular acceleration in a period corresponding to data of each image frame into shake information.

The memory 410 may be configured to store a software program and data information. The memory mainly includes a program storage area and a data storage area. The program storage area may store an operating system, and an application program required by at least one function, such as a photographing program. The data storage area may store data, a motion vector table, and the like that are created according to use of the terminal device.

The screen 408 may be configured to display a text, an image and/or a video.

Any hardware structure in FIG. 11 that is similar to or the same as that in this embodiment is applicable to this embodiment, and details are not described herein again.

Specifically, in an embodiment of the terminal device, the terminal device includes: the image sensor 4022, the first processor 406, the gyro sensor 4024, the central processing unit CPU 404, and the screen 408, where:

the image sensor 4022 may be configured to collect M image frames of a photographed object, where M is a positive integer and M≥2;

the first processor 406 is configured to process the data of the M image frames collected by the image sensor 4022, to obtain processed M image frames;

the gyro sensor 4024 may be configured to: when the terminal device collects data of each of the M image frames of the photographed object, obtain angular acceleration of the terminal device in an X-axis direction, a Y-axis direction, and a Z-axis direction;

the first processor 406 may further be configured to process the obtained angular acceleration in a period corresponding to the data of each image frame into shake information;

the central processing unit CPU 404 is configured to: select, from the processed M image frames, one image frame as a reference image, perform registration on each of (M−1) image frames based on the reference image, the shake information, and a preset motion vector table, and perform fusion on the registered images;

the central processing unit CPU 404 is further configured to perform compression processing on the fused image; and the screen 408 is configured to display the compressed image.

In an optional implementation manner, that the central processing unit CPU 404 performs registration on each of (M−1) image frames based on the reference image, the shake information, and a preset motion vector table includes:

calculating, by the first processor 406, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, and the preset motion vector table; and performing registration on each of the (M−1) image frames according to the motion vector.

In an optional implementation manner, the terminal device may further include a proximity sensor, where the proximity sensor is configured to obtain a depth; and that the central processing unit 404 performs registration on each of (M−1) image frames based on the reference image, the shake information, and a preset motion vector table includes:

performing, by the central processing unit 404, registration on each of the (M−1) image frames based on the reference image, the shake information, the depth, and the preset motion vector table; that is:

calculating, by the central processing unit 404, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, the depth, and the preset motion vector table; and performing registration on each of the (M−1) image frames according to the motion vector.

In an optional implementation manner, that the central processing unit 404 performs registration on each of (M−1) image frames based on the reference image, the shake information, and a preset motion vector table includes:

calculating, by the central processing unit 404, relative shake information of each of the (M−1) image frames relative to the reference image according to the shake information, obtained by means of processing, of each of the (M−1) image frames and time of each of the (M−1) image frames relative to the reference image;

searching for a relative motion vector of each of the (M−1) image frames relative to the reference image according to the relative shake information, exposure time of each of the (M−1) image frames, and the preset motion vector table;

searching for a motion vector near the relative motion vector based on the relative motion vector; and calculating, based on the relative motion vector and the searched motion vector near the relative motion vector, a matching degree between each of the (M−1) image frames and the reference image according to a matching criterion, and performing registration on each of the (M−1) image frames based on a motion vector with the highest matching degree.

Specifically, the central processing unit 404 performs registration on each of (M−1) image frames based on the reference image, the shake information, and a preset motion vector table. Reference may be made to the "General overview" part, and details are not described herein again.

Optionally, before the image sensor 4022 collects M image frames, the terminal device may further identify a current photographing scenario. Specifically, the identifying a current photographing scenario may be implemented by using the central processing unit 404, implemented by using the first processor 406, or implemented by using another independent chip apart from the central processing unit 404 and the first processor 406. This embodiment of the present invention imposes no limitation on a manner of identifying the current photographing scenario.

Optionally, the first processor 406 may determine, based on the current photographing scenario, collection parameters of photographing, where the collection parameters include a quantity M of to-be-collected image frames, exposure time of each image frame, and sensitivity of each image frame; and the collecting, by the image sensor 4022, M image frames specifically includes: collecting, by the image sensor 4022, data of M image frames of the photographed object according to the exposure time and the sensitivity.

Optionally, the performing, by the central processing unit 404, fusion on the registered images may be specifically: performing, by the central processing unit 404 according to the identified current photographing scenario, fusion on the M image frames. For a specific fusion method, reference may be made to the "General overview" part, and details are not described herein again.

It should be noted that the first processor 406 may be an image signal processor. If the terminal device is a mobile phone, the central processing unit 404 may be an application processor.

It can be learned from the foregoing that the terminal device provided in this embodiment of the present invention obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

Figure 13:
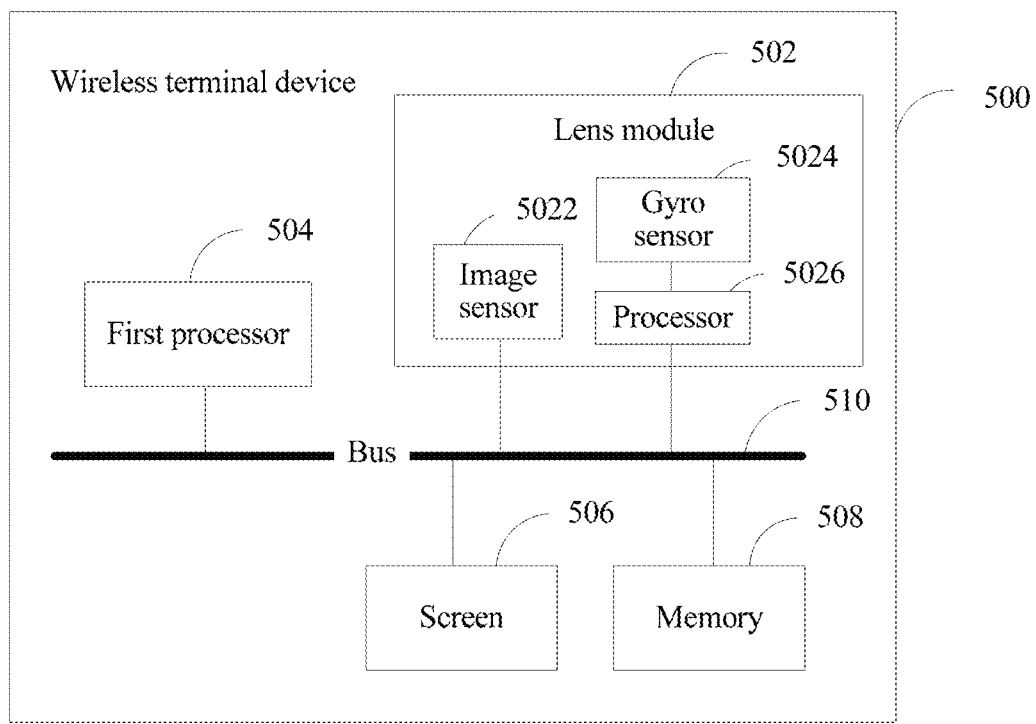
FIG. 13 is still another possible schematic structural diagram of a terminal device according to an embodiment of the present invention.

As shown in FIG. 13, an embodiment of the present invention provides a terminal device used for photographing. The terminal device 500 includes: a lens module 502, a first processor 504, a screen 506, and a bus 510. The terminal device may further include a memory 508. The lens module 502, the first processor 504, the screen 506, and the memory 508 are electrically connected by using the bus 510.

In this embodiment, the lens module 502 includes an image sensor 5022, a gyro sensor 5024, and a processor 5026. The image sensor 5022 may be configured to collect image data. The gyro sensor 5024 may be configured to obtain angular acceleration of the terminal device in an X-axis direction, a Y-axis direction, and a Z-axis direction. The processor 5026 may be configured to process the angular acceleration obtained by the gyro sensor 5024. Specifically, the processor 5026 may process, based on exposure time of each image frame and the angular acceleration, obtained by the gyro sensor 5024, of the terminal device in the X-axis direction, the Y-axis direction, and the Z-axis direction, the obtained angular acceleration in a period corresponding to data of each image frame into shake information.

The memory 508 may be configured to store a software program and data information. The memory mainly includes a program storage area and a data storage area. The program storage area may store an operating system, and an application program required by at least one function, such as a photographing program. The data storage area may store data, a motion vector table, and the like that are created according to use of the terminal device.

The screen 510 may be configured to display a text, an image and/or a video.

Any hardware structure in embodiments corresponding to FIG. 11 and FIG. 12 that is similar to or the same as that in this embodiment is applicable to this embodiment, and details are not described herein again.

Specifically, in an embodiment of the terminal device, the terminal device includes: the image sensor 5022, the gyro sensor 5024, the first processor 504, and the screen 506, where:

the image sensor 5022 may be configured to collect M image frames of a photographed object, where M is a positive integer and M≥2;

the gyro sensor 5024 may be configured to: when the terminal device collects data of each of the M image frames of the photographed object, obtain angular acceleration of the terminal device in an X-axis direction, a Y-axis direction, and a Z-axis direction;

the processor 5026 may be configured to process the obtained angular acceleration in a period corresponding to the data of each image frame into shake information;

the first processor 504 may be configured to process the data of the M image frames collected by the image sensor 5022, to obtain processed M image frames;

the first processor 504 may further be configured to: select, from the processed M image frames, one image frame as a reference image, perform registration on each of (M−1) image frames based on the reference image, the shake information, and a preset motion vector table, and perform fusion on the registered images;

the first processor 504 may further be configured to perform compression processing on the fused image; and the screen 506 may be configured to display the compressed image.

In an optional implementation manner, that the first processor 504 performs registration on each of (M−1) image frames based on the reference image, the shake information, and a preset motion vector table includes:

calculating, by the first processor 504, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, and the preset motion vector table; and performing registration on each of the (M−1) image frames according to the motion vector.

In an optional implementation manner, the terminal device may further include a proximity sensor, where the proximity sensor is configured to obtain a depth; and that the first processor 504 performs registration on each of (M−1) image frames based on the reference image, the shake information, and a preset motion vector table includes:

performing, by the first processor 504, registration on each of the (M−1) image frames based on the reference image, the shake information, the depth, and the preset motion vector table; that is:

calculating, by the first processor 504, relative shake information of each of the (M−1) image frames relative to the reference image according to the shake information, obtained by means of processing, of each of the (M−1) image frames and time of each of the (M−1) image frames relative to the reference image;

determining a motion vector of each of the (M−1) image frames relative to the reference image according to the relative shake information, exposure time of each of the (M−1) image frames, the depth, and the preset motion vector table; and performing registration on each of the (M−1) image frames according to the motion vector.

In an optional implementation manner, that the first processor 504 performs registration on each of (M−1) image frames based on the reference image, the shake information, and a preset motion vector table includes:

calculating, by the first processor 504, relative shake information of each of the (M−1) image frames relative to the reference image according to the shake information, obtained by means of processing, of each of the (M−1) image frames and time of each of the (M−1) image frames relative to the reference image;

searching for a relative motion vector of each of the (M−1) image frames relative to the reference image according to the relative shake information, exposure time of each of the (M−1) image frames, and the preset motion vector table;

searching for a motion vector near the relative motion vector based on the relative motion vector; and calculating, based on the relative motion vector and the searched motion vector near the relative motion vector, a matching degree between each of the (M−1) image frames and the reference image according to a matching criterion, and performing registration on each of the (M−1) image frames based on a motion vector with the highest matching degree.

Specifically, the first processor 504 performs registration on each of (M−1) image frames based on the reference image, the shake information, and a preset motion vector table. Reference may be made to the "General overview" part, and details are not described herein again.

Optionally, before the image sensor 5022 collects M image frames, the terminal device may further identify a current photographing scenario. Specifically, the identifying a current photographing scenario may be implemented by using the first processor 504, or may be implemented by using another independent chip apart from the first processor 504. This embodiment of the present invention imposes no limitation on a manner of identifying the current photographing scenario.

Optionally, the first processor 504 may determine, based on the current photographing scenario, collection parameters of photographing, where the collection parameters include a quantity M of to-be-collected image frames, exposure time of each image frame, and sensitivity of each image frame; and the collecting, by the image sensor 5022, M image frames specifically includes: collecting, by the image sensor 5022, data of M image frames of the photographed object according to the exposure time and the sensitivity.

Optionally, the performing, by the first processor 504, fusion on the registered images may be specifically: performing, by the first processor 504 according to the identified current photographing scenario, fusion on the M image frames. For a specific fusion method, reference may be made to the "General overview" part, and details are not described herein again.

It should be noted that the first processor 504 may be a central processing unit CPU of the terminal device. The first processor 504 may also be an application processor.

It can be learned from the foregoing that the terminal device provided in this embodiment of the present invention obtains shake information of each image frame according to angular acceleration of the terminal device when collecting data of M image frames, and performs registration based on a reference image and shake information of the other image frames relative to the reference image. This manner can effectively improve image quality, thereby improving photographing performance of the terminal device.

A person of ordinary skill in the art may be aware that, the terminal device or photographing method that is described with reference to the embodiments disclosed in this specification may be implemented by electronic hardware or a combination of computer software and electronic hardware. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims. Additionally, statements made herein characterizing the invention refer to an embodiment of the invention and not necessarily all embodiments.

What is claimed is:

1. A terminal device, comprising:
   a lens module comprising an image sensor, a gyro sensor, and a processor;
   an image signal processor;
   a central processing unit (CPU); and
   a screen;
   wherein the image signal processor is configured to determine, based on a current photographing scenario, collection parameters of photographing, wherein the collection parameters comprise a quantity M of to-be-collected image frames, exposure time of each image frame, and sensitivity of each image frame, wherein M is a positive integer greater than or equal to 2;
   wherein the image sensor is configured to collect data of M image frames of a photographed object according to the exposure time and the sensitivity;
   wherein the image signal processor is further configured to process the data of the M image frames collected by the image sensor, to obtain M processed image frames;
   wherein the gyro sensor is configured to: when the image sensor collects data of each of the M image frames of the photographed object, obtain angular acceleration of the terminal device in an X-axis direction, a Y-axis direction, and a Z-axis direction;
   wherein the processor of the lens module is configured to process the obtained angular acceleration in a period corresponding to the data of each image frame into shake information;

wherein the CPU is configured to:
  select, from the M processed image frames, one image frame as a reference image;
  perform registration on each of M−1 image frames based on the reference image, the shake information, and a preset motion vector table; and
  perform fusion on the registered image frames to obtain a fused image; and
  perform compression processing on the fused image to generate a compressed image in a predetermined format;
wherein the screen is configured to display the compressed image; and
wherein the CPU is further configured to:
  calculate relative shake information of each of the M−1 image frames relative to the reference image according to the shake information of each of the M−1 image frames and time of each of the M−1 image frames relative to the reference image;
  determine a motion vector of each of the M−1 image frames relative to the reference image according to the relative shake information, exposure time of each of the M−1 image frames, and the preset motion vector table; and
  perform registration on each of the M−1 image frames according to the motion vector.

2. The terminal device according to claim 1, further comprising a proximity sensor configured to obtain a depth.

3. The terminal device according to claim 2, wherein the CPU is further configured to:
  perform registration on each of the M−1 image frames based on the reference image, the shake information, the depth, and the preset motion vector table.

4. The terminal device according to claim 1, wherein the image signal processor and the CPU are integrated as a whole.

5. The terminal device according to claim 1, wherein the CPU and the processor of the lens module are integrated as a whole.

6. The terminal device according to claim 1, wherein the image signal processor, the processor of the lens module, and the CPU are integrated as a whole.

7. The terminal device according to claim 1, wherein the image signal processor and the processor of the lens module are integrated as a whole.

8. A photographing method, comprising:
  identifying, by a terminal device, a current photographing scenario, and determining, based on the current photographing scenario, collection parameters of photographing, wherein the collection parameters comprise a quantity M of to-be-collected image frames, exposure time of each image frame, and sensitivity of each image frame;
  collecting, by the terminal device, data of M image frames of a photographed object according to the exposure time and the sensitivity, and processing the data of the M image frames to obtain M processed image frames, wherein M is a positive integer and M≥2;
  when collecting data of each of the M image frames of the photographed object, obtaining, by the terminal device, angular acceleration of the terminal device in an X-axis direction, a Y-axis direction, and a Z-axis direction;
  processing, by the terminal device, the obtained angular acceleration in a period corresponding to the data of each image frame into shake information;
  selecting, by the terminal device from the M processed image frames, one image frame as a reference image,
  performing registration on each of M−1 image frames based on the reference image, the shake information, and a preset motion vector table, and performing fusion on the registered image frames to obtain a fused image; and
  compressing, by the terminal device, the fused image to generate a compressed image, and displaying the compressed image;
wherein performing registration on each of the M−1 image frames based on the reference image, the shake information, and the preset motion vector table comprises:
  calculating, by the terminal device, relative shake information of each of the M−1 image frames relative to the reference image according to the shake information of each of the M−1 image frames and time of each of the M−1 image frames relative to the reference image;
  determining a motion vector of each of the M−1 image frames relative to the reference image according to the relative shake information, exposure time of each of the M−1 image frames, and the preset motion vector table; and
  performing registration on each of the M−1 image frames according to the motion vector.

9. The method according to claim 8, wherein the terminal device further obtains a depth; and
wherein performing registration on each of the M−1 image frames based on the reference image, the shake information, and the preset motion vector table comprises: performing, by the terminal device, registration on each of the M−1 image frames based on the reference image, the shake information, the depth, and the preset motion vector table.

10. A terminal device, comprising:
  an image sensor configured to collect data of M image frames of a photographed object, wherein M is a positive integer and M≥2;
  a first processor configured to process the data of the M image frames collected by the image sensor, to obtain M processed image frames;
  a gyro sensor configured to: when the image sensor collects data of each of the M image frames of the photographed object, obtain angular acceleration of the terminal device in an X-axis direction, a Y-axis direction, and a Z-axis direction; and
  a second processor configured to process the obtained angular acceleration in a period corresponding to the data of each image frame into shake information;
wherein the first processor is further configured to:
  select, from the M processed image frames, one image frame as a reference image;
  perform registration on each of M−1 image frames based on the reference image, the shake information, and a preset motion vector table;
  perform fusion on the registered image frames to obtained a fused image; and
  perform compression processing on the fused image;
wherein the terminal device further comprises a screen configured to display the compressed image; and
wherein the first processor is further configured to:
  calculate relative shake information of each of the M−1 image frames relative to the reference image according to the shake information of each of the M−1 image frames and time of each of the M−1 image frames relative to the reference image;

determine a motion vector of each of the M−1 image frames relative to the reference image according to the relative shake information, exposure time of each of the M−1 image frames, and the preset motion vector table; and perform registration on each of the M−1 image frames according to the motion vector.

11. The terminal device according to claim 10, wherein the first processor is further configured to:

determine, based on an identified current photographing scenario, collection parameters of photographing, wherein the collection parameters comprise a quantity M of to-be-collected image frames, exposure time of each image frame, and sensitivity of each image frame.

12. The terminal device according to claim 10, wherein the terminal device further comprises a proximity sensor configured to obtain a depth.

13. The terminal device according to claim 10, wherein the first processor is an application processor.

14. The terminal device according to claim 10, wherein the first processor is an image signal processor.

* * * * *